United States Patent [19]

Everett

[11] Patent Number: 5,435,607

[45] Date of Patent: Jul. 25, 1995

[54] ROTARY COUPLER

[75] Inventor: James L. Everett, Clover, S.C.

[73] Assignee: S. E. Huffman Corporation, Clover, S.C.

[21] Appl. No.: 117,419

[22] Filed: Sep. 7, 1993

[51] Int. Cl.6 ............................................. F16L 39/04
[52] U.S. Cl. ................................... 285/134; 285/272; 285/136
[58] Field of Search ........................ 285/134, 136, 272

[56] References Cited

U.S. PATENT DOCUMENTS

| 908,414 | 12/1908 | Mellin | 285/136 |
|---|---|---|---|
| 2,273,579 | 3/1941 | Krieg . | |
| 2,365,538 | 12/1944 | Fischer | 285/136 X |
| 2,820,650 | 1/1958 | Leopold . | |
| 3,096,103 | 7/1963 | Murphy . | |
| 3,517,694 | 6/1970 | Lieffring . | |
| 3,820,600 | 6/1974 | Baugh . | |
| 3,847,107 | 11/1974 | Buddrus . | |
| 4,210,975 | 7/1980 | Teague, Jr. et al. . | |
| 4,214,780 | 7/1980 | Grace . | |
| 4,250,918 | 2/1981 | Tuson et al. . | |
| 4,260,183 | 4/1981 | Krupp . | |
| 4,260,382 | 4/1981 | Thompson | 285/136 X |
| 4,570,978 | 2/1986 | Arendt . | |
| 4,611,834 | 9/1986 | Rabinovich | 285/136 X |
| 4,635,971 | 1/1987 | Perratone et al. . | |
| 4,676,241 | 6/1987 | Webb et al. | 285/272 X |
| 4,683,912 | 8/1987 | Dubrosky . | |
| 4,801,161 | 1/1989 | McCann | 285/379 X |
| 5,022,686 | 6/1991 | Heel et al. . | |
| 5,110,159 | 5/1992 | Herold et al. . | |

FOREIGN PATENT DOCUMENTS 859491  1/1961  United Kingdom ................ 285/136

Primary Examiner—Randolph A. Reese
Assistant Examiner—Heather Chun Shackelford
Attorney, Agent, or Firm—Shefte, Pinckney & Sawyer

[57] ABSTRACT

A rotary coupler having two housing portions, one housing portion being rotatable with respect to the other housing portion includes two fluid channels including a water channel extending axially the length of the coupler and a slurry channel disposed radially outwardly of the water channel. A flow directing surface is disposed within the rotatable housing portion to direct a slurry of abrasive particles and air through the housing to the outlet in a continuous manner substantially without disruption of the compositional integrity of the slurry.

16 Claims, 2 Drawing Sheets

ROTARY COUPLER

BACKGROUND OF THE INVENTION

The present invention relates broadly to devices for directing a fluid stream across a rotary junction and, more particularly, to a device for directing at least two fluid streams, including a relatively high pressure water stream and a relatively low pressure slurry of air and abrasive particles, across a rotary junction while maintaining the compositional integrity of the slurry.

Rotary couplers are typically used in situations requiring a fluid stream directed from a central source to be moved through a predetermined angular displacement for aiming. Typically, these couplers should be rotatable through greater than 360° without reversing direction. Accomplishment of this task is a simple matter if one fluid stream is involved. For example, in Tuson et al U.S. Pat. No. 4,250,918, a fluid stream is directed along the rotational axis of the rotary coupler. This method positions the body of the rotary coupler radially outwardly from the fluid stream so that, essentially, the coupler rotates about the fluid stream.

Problems arise, however, when separate, multiple fluid streams are passed across the rotary junction. In that situation, the additional fluid streams must be positioned radially outwardly from the axis of rotation with generally cross-sectionally washer-like channels formed in the coupler, as seen in Grace, U.S. Pat. No. 4,214,780. The solution employed by Grace works when the fluid stream is a homogenous liquid capable of experiencing turbulent flow. However, the solution is insufficient for use in the field of water jet cutting. There, a mixture of abrasive particles in water is directed to a nozzle to be selectively aimed at a work piece, for example, a turbine blade, for removing worn portions thereof. In this case, there are typically two flow streams involved, to be mixed at the nozzle. One is a high pressure water stream on the order of 50,000 psi. The other is a slurry of abrasive particles, usually garnet, and air. The air/garnet slurry moves under the influence of a slight vacuum. Just prior to reaching the cutting orifice, the water stream flows through a venturi tube. Inside the venturi tube, a partial vacuum is created to draw the abrasive slurry into the water stream. This partial vacuum causes the slurry to travel through supply lines toward the mixing nozzle. Mixing must occur immediately prior to cutting application because the mixed stream is so abrasive that only a carbide nozzle can withstand the abrasive stream. Cost requirements prevent lining a coupler with a carbide material and, therefore, mixing is confined to the nozzle.

In order to properly position the water jet nozzle for cutting, a rotary coupler is provided which allows 360° movement of the nozzle. Due to the aforesaid abrasiveness of the mixed cutting stream, the abrasive slurry and the water jet must be passed through the rotary head separately. In the past, this has been accomplished by passing the water jet though a conduit formed along the rotational axis of the rotary coupler and a separate, flexible tube directing the abrasive slurry to the mixing nozzle. However, this separate, flexible tube prevented free rotary motion of the nozzle due to its tendency to wrap around the rotary coupler and the nozzle as the nozzle was rotated beyond a certain angular displacement. Accordingly, to move the nozzle beyond a certain angular displacement, the direction of rotation would have to be reversed, resulting in unnecessary movement and perhaps damage to the flexible abrasive tube. To compound the problem, the slurry is at such a low pressure that if the conventional method of multiple fluid line rotary couplers were employed, the disruption in flow of the slurry as it entered the necessary cylindrical chambers would cause the abrasive garnet to drop out of the slurry stream and the steam would tend to pulse, resulting in improper mixing at the mixing nozzle, causing uneven water jet cutting. Therefore, the slurry must remain substantially undisturbed and intact through its passage through the rotary coupler. Turbulence, direction reversal or blockage of the slurry can cause the garnet to drop out of the mixture or otherwise cause an uneven mixture of air and garnet which causes the aforesaid pulsing at the mixing nozzle. Therefore, the need exists for a rotary coupler which can successfully pass therethrough a high pressure water stream and a low pressure abrasive slurry.

SUMMARY OF THE INVENTION

It is accordingly an object of the present invention to provide a rotary coupler which addresses the aforesaid problems. More particularly, it is an object of the present invention to provide a rotary coupler which can pass a high pressure water stream and a low pressure abrasive slurry stream therethrough in a continuous, undisrupted manner for even mixing of the slurry and water at a downstream mixing nozzle.

According to the preferred embodiment of the present invention, a rotary coupler for directing a fluid stream across a rotary junction includes a housing having a first portion with at least two fluid inlets and a second portion with at least two fluid outlets, the second portion being rotatable with respect to the first portion about a longitudinal axis. A channel arrangement is formed in the first housing portion for directing the fluid stream from the inlet across the rotary junction to the second housing portion and is also formed in the second housing portion in communication with the first housing portion channel arrangement for directing the fluid stream from the first housing channel to the fluid outlet. A fluid directing arrangement is disposed within the second housing channel arrangement and includes a fluid directing surface formed thereon configured for engaging the flow stream at an angle of incidence of less than 90° for directing the flow stream through the second housing channel in a substantially continuous manner.

According to a second preferred embodiment of the present invention, the rotary coupler may be configured for passage therethrough of two separate fluid streams across the rotary junction. According to this embodiment, the first housing portion includes at least two fluid inlets and the second housing portion includes at least two fluid outlets. A first channel arrangement is formed in both the first housing portion and the second housing portion between one inlet and one outlet generally along the longitudinal axis and extending for fluid communication between the housing portions across the rotary junction for passage of a first fluid stream from one of the inlets to one of the outlets. A second channel arrangement is formed in both the first housing portion and the second housing portion between the other inlet and the other outlet radially outwardly from the first channel arrangement and extending for fluid communication between the first housing portion and the second housing portion across the rotary junction for passage of a second fluid stream from the other inlet to the other outlet. A fluid directing arrangement is disposed within the second housing portion along the second channel arrangement and includes a fluid directing surface configured for engaging the second flow stream at an angle of incidence less than 90° for directing the flow stream in a substantially undisrupted condition through the second housing portion to the outlet.

Preferably, one of the fluid streams is water and the other fluid stream is a slurry of abrasive particles and air and the fluid directing arrangement is configured to maintain a substantially continuous concentration of abrasive in the slurry stream as it flows through the second channel arrangement to the other outlet. The fluid directing arrangement preferably includes a tapered member having the fluid directing surface formed thereon to taper therewith, the tapered member being tapered from a position adjacent the rotary junction to a position adjacent the outlet thereby presenting the fluid directing surface to the second flow stream at an angle of incidence of less than 90°.

It is preferred that the second housing portion include an outer shell and a generally cylindrical inner member disposed along the longitudinal axis with the second channel arrangement being formed intermediate the outer shell and the inner member resulting in the second channel arrangement having a generally washer-like cross section with the fluid directing surface being tapered axially within the second channel arrangement.

Preferably, the first channel arrangement in the second housing portion includes an axial channel formed through the inner member.

It is further preferred that the present invention include a sealing arrangement intermediate the housing portions at the rotary junction and the second channel arrangement formed in the first housing portion extend into the second housing portion beyond the sealing arrangement for introducing the slurry stream into the second channel arrangement within the second housing portion at a position beyond the sealing arrangement to enhance the ability of the fluid directing surface to maintain the compositional integrity of the slurry stream.

DESCRIPTION OF THE PREFERRED EMBODIMENT

Figure 1:
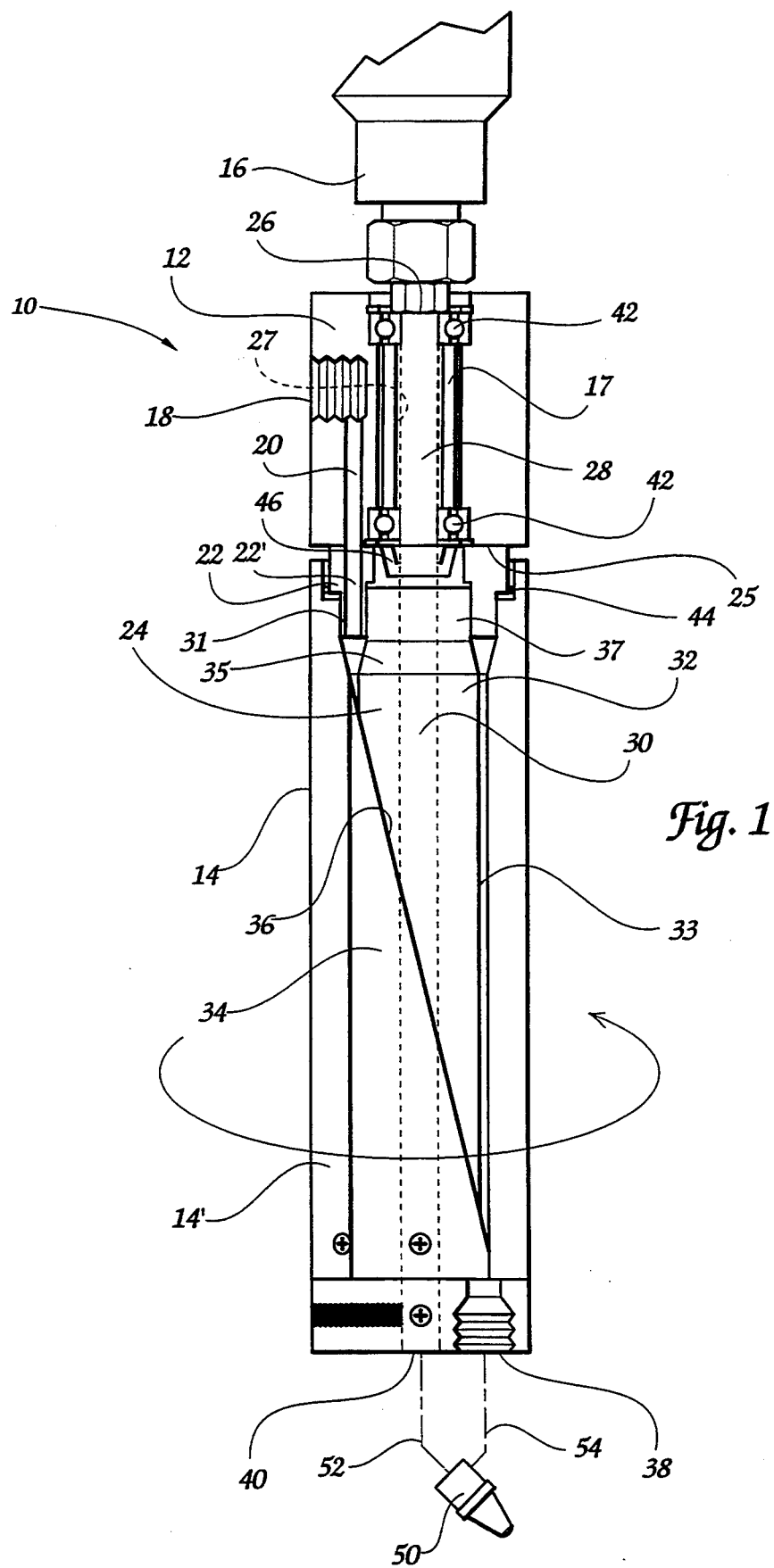
FIG. 1 is a cross sectional view of a rotary coupler illustrated in FIG. 1 showing a side view of the fluid directing member.

Referring now to the accompanying drawings and initially to FIG. 1, a rotary coupler according to the preferred embodiment of the present invention is shown generally at 10. The rotary coupler 10 is formed of two housing portions 12, 14 attached to a rotary driver 16. Each housing portion 12, 14 is formed as a generally hollow cylinder. The first housing portion 12 is attached to a rotary driver 16 at one axial end thereof, while the second housing portion 14 is rotatably attached to the other axial end of the first housing portion }2 in generally linear alignment therewith, defining a rotary junction 25 therebetween. A generally cylindrical, hollow drive shaft 17 extends from the driver 16 through the first housing portion 12 to the second housing portion 14 where it is fixedly attached thereto. Conventional bearings 42 rotatably support the drive shaft 17 within the first housing portion 12. Accordingly, rotation induced by the drive member 16 causes rotation of the drive shaft 17 which in turn causes the second housing portion 14 to rotate with respect to the first housing portion 12 through a predetermined angular displacement. A conventional sealing arrangement 44, 46 is disposed intermediate the first housing portion 12 and the second housing portion 14 at the rotary junction 25. A mixing nozzle, shown schematically at 50, is attached to the second housing portion 14 by conventional fluid transmission lines, a water line indicated generally at 52 and a slurry line indicated generally at 54.

As previously stated, the present invention is configured for passing two distinct fluid streams across the rotary junction 25 between the first housing portion 12 and the second housing portion 14 to allow the nozzle 50 to be precisely aimed for controlled water jet abrasion of a workpiece. The fluids involved are water, at a pressure of approximately 50,000 PSI, and an abrasive slurry of air and garnet, moving under the influence of a partial vacuum caused by the water jet passing through a venturi (not shown) associated with the mixing nozzle 50. The water stream is passed axially through the center of the coupler 10 so that it remains unaffected by rotation of the second housing portion 14. To that end, a generally cylindrical, hollow sleeve 27 is disposed axially along the full longitudinal extent of the coupler 10. A water channel 28 is formed in the sleeve 27 to extend axially from the driver 16 through a water inlet 26 formed in generally the axial center of the first housing portion 12 to the second housing portion 14 where an axial water channel 30 is formed therethrough extending to the water outlet 40. In the first housing portion 12, the water channel 28 is formed radially inwardly from the drive shaft 17. Accordingly, the water stream remains essentially unaffected by rotation of the second housing portion 14 with respect to the first housing portion 12 which, essentially, rotates around the water stream.

The slurry stream is more difficult to move across the rotary junction 25. To that end and with continued reference to FIG. 1, a slurry inlet 18 is formed in one side wall of the first housing portion 12. A slurry channel 20 is formed therein to extend from the inlet 18 to the rotary junction 25. The second housing portion 14, previously described as a hollow cylinder, includes an outer shell 14' and a generally cylindrical inner member 32 extending the axial length thereof which further includes the water channel 30 extending axially through the center thereof. The inner member 24 tapers radially inwardly slightly near the inlet chamber 31, defining a tapered shoulder 35, and then projects linearly outwardly into the inlet chamber 31, defining a tip 37. A generally cylindrical slurry channel extension 22 extends from the end of the first housing portion 12 at the rotary junction 25 inwardly into the inlet chamber 31, surrounding the tip 36 of the inner member 32, terminating the first slurry channel 20 at the tapered portion 34 of the inner member. The slurry channel extension 22 forms a collar around the inner member tip 37 and includes an extended slurry channel 22' formed therethrough.

Figure 2:
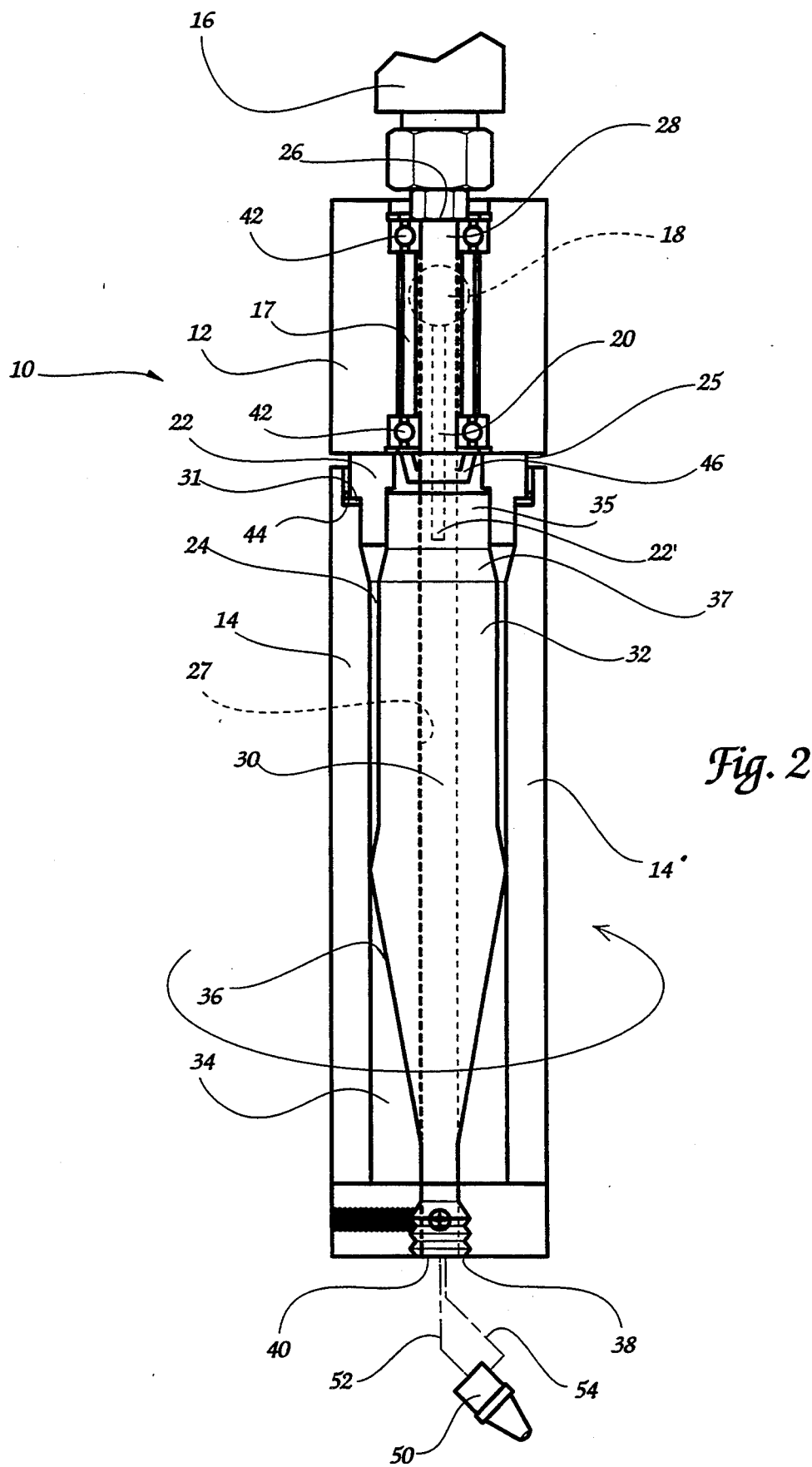
FIG. 2 is a cross sectional view of a rotary coupler according to the preferred embodiment of the present invention showing a front view of the fluid directing member.

A spacing 33 is formed between the inner member 32 and the inner walls of the outer shell 14' to define a slurry flow channel 24 extending through the second housing portion 14. A fluid directing member 34 is fixedly attached to the inner member 32 to rotate with the second housing portion 14. The fluid directing member 34 is disposed within the spacing 33 between the inner member 32 and the inner walls of the outer shell 14'. The fluid directing member 34 is formed as a generally hollow cylinder sliced diagonally from a position adjacent one end to a position adjacent the other end. The upper surface of the cylinder remaining after the diagonal cut defines a fluid directing surface 36. When fitted to the inner member 32, the fluid directing member 36 tapers from a position adjacent the tapered shoulder 35 of the inner member 32 to a position adjacent a slurry outlet 38 formed in the second housing portion 14 adjacent the water outlet 40. This configuration defines a flow channel 24 having a cross-sectional area that diminishes axially from the fluid inlet to the fluid outlet. As can best be seen in FIG. 2, the walls of the fluid directing member 34 are removed adjacent the slurry outlet 38 to provide a flow path to the slurry outlet 38. Viewed from the side, as in FIG. 1, the fluid directing member has a triangular or needlelike appearance. With reference to FIG. 1, it can be seen that the upper portion of the flow directing member 36 is located adjacent the inlet chamber 31. The tapered configuration of the flow directing member 38 provides a flow directing function while presenting no orthogonal surface to the slurry stream. In other words, the angle of incidence of the slurry stream onto the fluid directing surface is always less than 90° regardless of the position of the flow directing member 34, and, therefore, the flow directing surface 36, with respect to the slurry flow stream emitted from the slurry channel extension 22.

In operation, high pressure water is injected from the driver 16 through the water inlet 26, the water channel 28 formed in the first housing portion 12, across the rotary junction 25, through the water channel 30 formed in the inner member 32 disposed within the second housing portion 14, to the water outlet 40 where it is directed by fluid lines 52 to the mixing nozzle 50. A venturi (not shown) within the mixing nozzle acts to draw a partial vacuum on the slurry lines 54 which causes the slurry to flow at a low pressure. The low pressure slurry enters the first housing portion 12 at the slurry inlet 18 and is directed through the slurry channel 20 into the slurry channel extension 22 projecting inwardly into the inlet chamber 31 of the second housing portion 14. The slurry is emitted therefrom and first contacts the tapered shoulder 35 of inner member 32. The slurry is disbursed within the slurry channel 24 with the slurry contacting the inner walls of the outer shell 14' of the first housing portion 14 and, thereby, the fluid directing surface 36. Since no orthogonal surfaces are presented to the slurry stream, the slurry flows with consistent compositional integrity to the slurry outlet 38 where it is directed through slurry lines 54 to the mixing nozzle 50 for mixing with the water to form the abrasive fluid.

The second housing portion 14 may be directed to any predetermined angular displacement which causes the fluid directing member 34 to rotate therewith. Regardless of the position of the fluid directing member 34 with respect to the slurry channel extension 22, and therefore, the incoming slurry stream, the angle of incidence of the slurry stream onto the flow directing surface 36 is always less than 90° which acts to maintain the garnet in air suspension. The continuous slurry flow provided by the present invention regardless of the angular displacement of the second housing portion 14 with respect to the first housing portion 12 results in a continuous stream of abrasive fluid which is properly mixed and therefore controllable for precision abrading of a work piece, such as a turbine blade. Due to the internal channeling of the slurry across the rotary junction 25, external slurry lines are unnecessary and therefore greater than 360° of rotation is possible without experiencing the problem of an external fluid line wrapping around a rotating coupler.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A rotary coupler for directing a fluid stream across a rotary junction comprising:

a housing having a first portion with a fluid inlet formed therein and a second portion with a fluid outlet formed therein, said second housing portion being rotatable with respect to said first housing portion about a longitudinal axis;

channel means being formed in said first housing portion for directing the fluid stream from said inlet across the rotational junction to said second housing portion and being formed in said second housing portion in fluid communication with said first housing channel means for directing the fluid stream from said first housing channel means to said fluid outlet; and fluid directing means disposed within said second housing channel means and having a fluid directing surface formed thereon defining a cross-sectional area of said second housing channel means which diminishes axially from said second portion fluid inlet to said second portion fluid outlet and engaging the flow stream at an angle of incidence of less than 90° for directing the fluid stream through said second housing channel means in a substantially continuous manner.

2. A rotary coupler according to claim 1 wherein said fluid stream is a slurry of abrasive particles and air and said flow directing means is configured to maintain a substantially continuous concentration of abrasive in the slurry stream as it flows through said channel means to said outlet.

3. A rotary coupler according to claim 1 wherein said flow directing means includes a tapered member having the flow directing surface formed thereon to taper therewith, said tapered member being tapered from a position adjacent the rotary junction to a position adjacent the outlet thereby presenting said flow directing surface to the flow stream at an angle of incidence of less than 90°.

4. A rotary coupler according to claim 3 wherein said second housing portion includes an outer shell and a generally cylindrical inner member disposed along said longitudinal axis, said channel means being formed intermediate said outer shell and said inner member thereby having a generally washer-like cross section, and said flow directing member is tapered axially within said second housing channel means.

5. A rotary coupler according to claim 4 wherein said first housing portion includes a second fluid inlet and a first axial channel formed therethrough generally coaxially with said rotational axis and in fluid communication with said second fluid inlet, and said cylindrical inner member includes a second fluid outlet and a second axial channel in fluid communication with said second fluid outlet, said first axial channel being formed substantially coaxial with and in fluid communication with said second axial channel for passage therethrough of a second, separate stream of fluid from said second inlet to said second outlet.

6. A rotary coupler according to claim 1 and further comprising sealing means disposed intermediate said first and second housing portions of the rotary junction and said first channel means extends into said second housing portion beyond said sealing means for introducing the fluid stream into said second channel means at a position beyond said sealing means for enhanced sealing of the rotary junction.

7. A rotary coupler for directing at least two separate streams of fluid across a rotary junction, said rotary coupler comprising:
a housing having a first portion with at least two fluid inlets and a second portion with at least two fluid outlets, said second housing portion being rotatable with respect to said first housing portion about a longitudinal axis;
first channel means formed in both said first housing portion and said second housing portions between one said inlet and one said outlet generally along said longitudinal axis and extending for fluid communication between said housing portions across the rotary junction therebetween for passage of a first fluid stream from one of said inlets to one of said outlets;
second channel means formed in both said first housing portion and said second housing portion extending between the other said inlet and the other said outlet, said second channel means being disposed radially outwardly from said first channel means and extending for fluid communication between said first and second housing portions across the rotary junction therebetween for passage of a second fluid stream from the other of said inlets to the other of said outlets; and
fluid directing means disposed within said second housing portion along said second channel means and having a fluid directing surface which defines a cross-sectional area of said second housing channel means which diminishes axially from the other said inlet to the other said outlet, said fluid directing surface being configured for engaging the second flow stream at an angle of incidence less than 90° for directing the second flow stream in a substantially undisrupted condition through said second housing portion to said other outlet.

8. A rotary coupler according to claim 7 wherein one of the fluid streams is a slurry of abrasive particles and air and is directed through said second channel means, and said fluid directing means is configured to maintain a substantially continuous concentration of abrasive in the slurry stream as it flows through said second channel means to said other outlet.

9. A rotary coupler according to claim 7 wherein said flow directing means includes a tapered member having said fluid directing surface formed thereon to taper therewith, said tapered member being tapered from a position adjacent the rotary junction to a position adjacent said outlet thereby presenting said fluid directing surface to the second flow stream at an angle of incidence of less than 90°.

10. A rotary coupler according to claim 9 wherein said second housing portion includes an outer shell and a generally cylindrical inner member disposed along said longitudinal axis, said second channel means being formed intermediate said outer shell and said inner member thereby having a generally washer-like cross section and said flow directing surface is tapered axially within said channel means.

11. A rotary coupler according to claim 10 wherein said first channel means extends through said inner member.

12. A rotary coupler according to claim 7 and further comprising sealing means intermediate said first housing portion and said second housing portion, and said second channel means formed in said first housing portion extends into said second housing portion beyond said sealing means for introducing the fluid stream into said channel means formed in said second housing portion at a position beyond said sealing means for enhanced sealing at the rotary junction.

13. A rotary coupler for directing a stream of water and a separate stream of air mixed with abrasive particles to form a slurry across a rotary junction, said coupler comprising:
a housing having a first portion with a water inlet and a separate slurry inlet formed therein, and a second portion with a water outlet and a separate slurry outlet formed therein, said second housing portion being rotatable with respect to said first housing portion about a longitudinal axis;
a water channel formed in both housing portions along said axis for directing the water stream across the rotary junction from said water inlet to said water outlet;
a slurry channel formed in both housing portions radially outwardly from said axis for directing the slurry across the rotary junction from said slurry inlet to said slurry outlet; and
a slurry directing member rotatable with said second housing portion and disposed in the slurry channel and having a slurry directing surface formed thereon and configured for engaging the slurry stream at an angle of incidence of less than 90° for directing the slurry stream through the slurry channel while substantially maintaining the compositional integrity of the slurry stream.

14. A rotary coupler according to claim 13 wherein said slurry directing surface is tapered from a position adjacent the rotary junction to a position adjacent the slurry outlet thereby presenting said directing surface to the slurry stream at an angle of incidence of less than 90°.

15. A rotary coupler according to claim 14 wherein said second housing portion includes an outer shell and a generally cylindrical inner member disposed along said longitudinal axis, said slurry channel being formed intermediate said outer shell and said inner member thereby having a generally washer-like cross section, and said flow directing surface is tapered axially within said slurry channel.

16. A rotary coupler according to claim 13 and further comprising sealing means disposed intermediate said housing portions at the rotary junction and said slurry channel extends into said second housing portion beyond said sealing means for introducing the slurry stream into said slurry channel at a position beyond said sealing means.

* * * * *